(12) United States Patent
Jeoung et al.

(10) Patent No.: US 7,339,633 B2
(45) Date of Patent: Mar. 4, 2008

(54) LIQUID CRYSTAL DISPLAY PANEL WITH REDUCED PARASITIC IMPEDANCE

(75) Inventors: Hun Jeoung, Gyeongsangbuk-Do (KR); Seung Jun Moon, Gumi Gyeongsangbuk, Do (KR)

(73) Assignee: LG. Philips LCD. Co., Ltd, Seoul (KR)

(*) Notice: Subject to any disclaimer, the term of this patent is extended or adjusted under 35 U.S.C. 154(b) by 230 days.

(21) Appl. No.: 10/879,605

(22) Filed: Jun. 29, 2004

(65) Prior Publication Data

US 2005/0094076 A1    May 5, 2005

(30) Foreign Application Priority Data

Oct. 30, 2003  (KR)  .................. 10-2003-0076486

(51) Int. Cl.
*G02F 1/1343* (2006.01)
(52) U.S. Cl. .................... 349/38; 349/39; 349/150
(58) Field of Classification Search ............ 349/39, 349/150
See application file for complete search history.

(56) References Cited

U.S. PATENT DOCUMENTS

| 6,567,064 | B1* | 5/2003 | Song et al. | 345/94 |
| 2003/0067579 | A1* | 4/2003 | Inoue et al. | 349/187 |
| 2005/0094076 | A1* | 5/2005 | Jeoung et al. | 349/139 |

* cited by examiner

*Primary Examiner*—David Nelms
*Assistant Examiner*—Phu Vu
(74) *Attorney, Agent, or Firm*—Brinks Hofer Gilson & Lione

(57) ABSTRACT

A liquid crystal display includes an array substrate, a data line, a gate line, a first and a second storage wiring, and a second substrate. The data line is disposed on the array substrate and intersects the gate line near a first pixel region. A second substrate, such as a color filter substrate, includes a second pixel region that corresponds to the first pixel region. The first storage wiring is positioned near an edge of the array substrate and the second storage wiring is disposed on the second substrate near an edge of the second substrate.

20 Claims, 4 Drawing Sheets

LIQUID CRYSTAL DISPLAY PANEL WITH REDUCED PARASITIC IMPEDANCE

PRIORITY CLAIM

This application claims the benefit of Korean Patent Application No. P2003-76486 filed in Korea on Oct. 30, 2003. The disclosure of the application is incorporated herein by reference.

BACKGROUND

1. Technical Field

The present invention relates to displays, and more particularly to a liquid crystal display panel with a reduced source resistance.

2. Related Art

Displays convey information to viewers. In the past, displays conveyed images and text through bulky, heavy, and expensive cathode ray tubes. Developments in flat panel displays having almost the same display quality as the cathode ray tubes, now convey images through much thinner screens. Further efforts are now being expended to increase the clarity of some flat panel displays images. One such display is a liquid crystal display device.

A liquid crystal display device uses a liquid compound to display images and text by controlling the light transmittance through the liquid compound. Some liquid crystal display devices include a liquid crystal display panel that has a driving circuit, a back light unit, and an liquid crystal display panel. The liquid crystal display panel may include a color filter substrate, an array substrate of thin film transistors (TFTs), and a liquid crystal layer sandwiched between the color filter substrate and the array substrate.

FIG. 1 is a plan view of a portion of an array substrate 10 of a liquid crystal display panel. The entire liquid crystal display panel is comprised of N gate lines and M data lines. The intersection of the N lines and the M lines form N×M pixels. As shown, the array substrate 10 includes a gate line 16 and a data line 17 that form a pixel region. A thin film transistor is formed at an intersection of the gate line 16 and the data line 17, with a pixel electrode 18 being formed at the pixel region.

In FIG. 1, a thin film transistor includes a gate electrode 21 connected to the gate line 16, a source electrode 22 connected to the data line 17, and a drain electrode 23 connected to the pixel electrode 18 through a first contact hole 40. The thin film transistor also includes a semiconductor layer (not shown) that forms a conductive channel between the source electrode 22 and the drain electrode 23. Gate voltages supplied to a gate electrode 21 are insulated from the source/drain electrodes 22 and 23 by a gate insulating film (not shown). A second insulating film (not shown) positioned above the gate insulating film insulates the gate electrodes. A first contact hole 40a that passes through the second insulating film connects the drain electrode 23 to a pixel electrode 18.

A pixel electrode 18 is coupled to a liquid crystal capacitor, a common electrode (not shown), of a color filter substrate. When a voltage is applied to a liquid crystal capacitor, charge is stored only temporarily because parasitic impedance provides a conducting path that tends to bleed off the charge. To overcome the transient nature of the circuit, a storage capacitor is connected to the liquid crystal capacitor.

In FIGS. 1 and 2A a storage capacitor may be formed by two methods. A first method forms an electrode for the storage capacitor that is connected to the storage electrode. A second method uses part of n-1$^{th}$ gate line to form an electrode for the storage capacitor of an n$^{th}$ pixel. The former method is called a storage on common method or an independence storage capacitor method, and the latter method is called a storage on gate method or a previous gate method.

The storage on gate method does not need external storage wirings since a storage signal is applied through the gate line. However, this method may cause interference with a storage voltage since it may be coupled to a previous gate signal. In comparison with the storage on gate method, the storage on common method needs additional wirings to receive and sustain a charge, but can maintain that charge without experiencing significant loses.

FIG. 1 shows a liquid crystal display panel having a storage capacitor formed by a storage on common method that uses a special storage line. As shown, a storage line 70 may be formed near the middle portion of the pixel region and may extend in a direction parallel to the gate line 16. The storage line 70 is used as an auxiliary capacitor (C) of a liquid crystal capacitor formed by the pixel electrode 18 and the common electrode. That is, the storage capacitor (C) is formed by a first storage electrode 70a and a second storage electrode 70b that is electrically connected to the pixel electrode 18 through a second contact hole 40b passing through a second insulating film. In fabrication, the second storage electrode 70b is formed on the first insulating film when the data line 17 and the source/drain electrode 22 and 23 are formed.

In FIG. 2a a circuit equivalent to a pixel of a liquid crystal display panel is shown. In this circuit, a thin film transistor (T) is turned on by a gate voltage received through a gate electrode (G) and a gate line (Gn). A data voltage that transmits an image signal is applied to a source electrode (S) connected to a data line (Dm). In FIG. 2A, the data voltage applied to the drain electrode (D) is applied to each liquid crystal capacitance ($C_{ic}$) and a storage capacitance ($C_{st}$). When the data voltage is applied, it creates an electric field by the potential difference between the pixel electrode (P) and the common electrode.

The liquid crystals material aligns with the electric field and polarizes the light that passes through it. Unfortunately, the properties or characteristics of some liquid crystals may change when a DC voltage is applied for an extended period of time. To prevent some deterioration of the liquid crystal, the polarity of an image signal maybe changed periodically through a common electrode (Com). This driving method is known as an inversion driving method.

When a thin film transistor (T) is turned on, a voltage applied to the liquid crystal capacitance ($C_{ic}$) and the storage capacitance ($C_{st}$) must be continuously maintained until the thin film transistor (T) is turned off. However in many displays, pixel voltages change (by $\Delta V$) because of a parasitic capacitance formed by the overlap of the gate electrode (G) and the source/drain electrodes (S, D). The additional capacitance causes this voltage change, which is known as a level shift voltage or a kickback voltage. This incremental voltage may be calculated by the voltage divider shown below.

$$\Delta V = \{C_{gs}/\{C_{gs}+C_{ic}+C_{st}\}\} * \Delta V_g \qquad \text{Equation 1}$$

In equation 1, $\Delta V_g$ denotes the change in gate voltage, that is, the difference between a gate on voltage ($V_{on}$) and a gate off voltage ($V_{off}$). The voltage distortion bleeds off the voltage maintained at the pixel electrode (P) regardless of the polarity of the data voltage. This phenomenon is illustrated in FIG. 2b. In FIG. 2b, $V_g$, $V_d$, and $V_p$, respectively denote a gate voltage, a data voltage, and a pixel electrode voltage. $V_{com}$ and $\Delta V$, respectively, denote a voltage (common voltage) and a kickback voltage.

As shown by the dotted line in FIG. 2b, a data voltage ($V_d$) is maintained at a pixel electrode (P) in an ideal liquid crystal display panel even in the absence of a gate voltage. Unfortunately, the reality of the solid line shows that a pixel voltage ($V_p$) may drop by as much as a kickback voltage ($\Delta V$) in actual liquid crystal display panels.

An effective value for a voltage applied to a liquid crystal is set by the level between a pixel voltage ($V_p$) and a common voltage ($V_{com}$). When the liquid crystal display panel is driven by an inversion method, a common voltage ($V_{com}$) level must be controlled so that level of pixel voltages ($V_p$) are symmetrical on the basis of the common voltage ($V_{com}$). To this end, a constant common voltage ($V_{com}$) by which levels of pixel voltages ($V_p$) are symmetrical may be applied.

Variations in pixel voltage may occur because the amount of pixel voltage ($V_p$) charged at each pixel may become different between frames when levels of pixel voltages ($V_p$) are not symmetrical based on the common voltage ($V_{com}$). This condition may cause a screen flicker to occur when an inverted pixel voltage is sourced. However, even when a constant common voltage ($V_{com}$) is applied to prevent a screen flicker, a DC component may remain at the pixel voltage ($V_p$) level due to a polar asymmetry of an image signal created by the kickback voltage ($\Delta V$). A flicker, an afterimage, or a non-uniform image may occur.

Problems such as a screen flicker, an afterimage, or other similar interferences may be minimized by designing a storage capacitor within a liquid crystal display panel. A storage capacitor provides a storage capacitance ($C_{st}$) that may dampen the kickback voltage ($\Delta V$). If a storage capacitor is formed by a storage on common method, special external storage wirings will be needed as shown in FIG. 3.

FIG. 3 is a plan view showing an array substrate 10 that includes storage wirings formed by a storage on common method. As shown, the array substrate 10 includes a pixel portion 20 formed by a plurality of pixel regions. The pixel regions are formed by a plurality gate lines (not shown) intersecting a plurality of data lines (not shown). A gate and data driving circuit 40 and 50, respectively, that drive a liquid crystal display panel are also shown.

The gate and data driving circuit 40 and 50, respectively, include a data driving circuit 50 coupled to data pads (not shown) and a gate driving circuit 40 coupled to gate pads (not shown), for transmitting signals to each gate line and each data line. A gate driver integrated circuit (IC) (not shown) and a data driver IC sequentially transmit signals to the respective pads.

In FIG. 3, each driver IC is mounted by a tape carrier package (TCP) method. The gate driver IC is mounted through a gate tape carrier package, and the data driver IC is mounted through a data tape carrier package. The data tape carrier package receives a data signal and a gate signal from a timing controller, and transmits the data signal to a data line of a liquid crystal display panel and transmits the gate signal to the gate tape carrier package. In the liquid crystal display device of FIG. 3, the timing controller and the data tape carrier package are mounted to a data circuit board. In these devices, the tape carrier package is attached to a gate circuit board that receives a gate signal through a flexible printed circuit. The flexible printed circuit connects the data circuit board to the gate circuit board. The gate signal is further transmitted to each gate tape carrier package through wiring printed onto the flexible circuit board.

In some liquid crystal displays, a gate circuit board is not needed. In these displays, a gate signal is transmitted through a wiring formed at a corner of a substrate. The gate signals do not pass through a flexible printed circuit but are instead transmitted to each gate tape carrier package through a wiring formed on the substrate.

In these liquid crystal displays, a storage line 70 as shown in FIG. 1, extends toward a gate driving circuit 40 in the pixel portion 20 and is connected to a storage signal supply wire 80. In FIG. 3, a storage voltage is transmitted from the data driving circuit 50 through a storage connection line 81 formed at one end of the storage signal supply wire 80. The storage signal supply wire 80 is formed between the pixel portion 20 of the array substrate 10 and the gate driving circuit 40. A silver dot pattern 60 maybe formed at the corners of the pixel portion 20 of the array substrate 10 to apply a common voltage to a color filter substrate.

In FIG. 3, one end of each storage line 70 is connected to the storage signal supply wire 80. The storage wirings 80 and 81 are then used to form an equivalent electric field. As shown, the storage wirings 80, 81 extend across large areas such as between a pixel region adjacent to a data pad and a pixel region positioned at an end of the storage signal supply wire or line. The length of this wire 86 may generate a voltage drop due to its internal resistance. Because of this resistance, signals may become attenuated which may cause image distortions.

As shown in FIG. 2a, a variation in voltage within a pixel portion may substantially affect a pixel's charge. An effective voltage difference may occur with a change in the common voltage (Vcom), thereby creating an image change. If the storage signal is greatly changed, an effective voltage at the pixel portion may substantially change too. In this liquid crystal display, a common voltage and a storage voltage determine the effective voltage of the pixel portion. All of the voltages substantially affect the effective voltage, and these signals must maintain a stable voltage.

Since a screen flicker or cross talk may occur with variations in a common voltage (Vcom), the source resistance (R) of the common voltage and the storage wiring and their capacitance (C) must be minimized. To that end, in some liquid crystal displays, the width of a common voltage wiring must be wide enough to minimize resistance, and the wiring area of the storage part must be wide enough to minimize the capacitive and resistive coupling that may occur.

The present invention is directed to a display that overcomes these potential drawbacks of the related art.

SUMMARY

A liquid crystal display comprises an array substrate, a data line, a gate line, a first and a second storage wiring, and a second substrate. The data line is disposed on the array substrate and intersects the gate line near a first pixel region. A second substrate, which maybe a color filter substrate, comprises a second pixel region that corresponds to the first pixel region. The first storage wiring is positioned near an edge of the array substrate and the second storage wiring is disposed near an edge of the second substrate.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the inventions. Moreover, in the figures, like referenced numerals designate corresponding parts throughout the different views.

DETAILED DESCRIPTION OF THE PREFERRED EMBODIMENTS

A liquid crystal display panel may maintain the voltage that aligns the molecules that make up a liquid crystal layer. By maintaining a constant storage voltage, the liquid crystal display embodiment may minimize flicker, afterimages, and/or other forms of image distortion. By adding storage wiring onto a second substrate, such as a color filter substrate, the continuous length of wire sourcing the storage signal decreases, which decreases the sourced impedance. By reducing the source resistance (e.g., a linear impedance) and/or the capacitive coupling (e.g., a nonlinear impedance) caused by the storage wires, the image quality of the liquid crystal display may improve.

Figure 1:
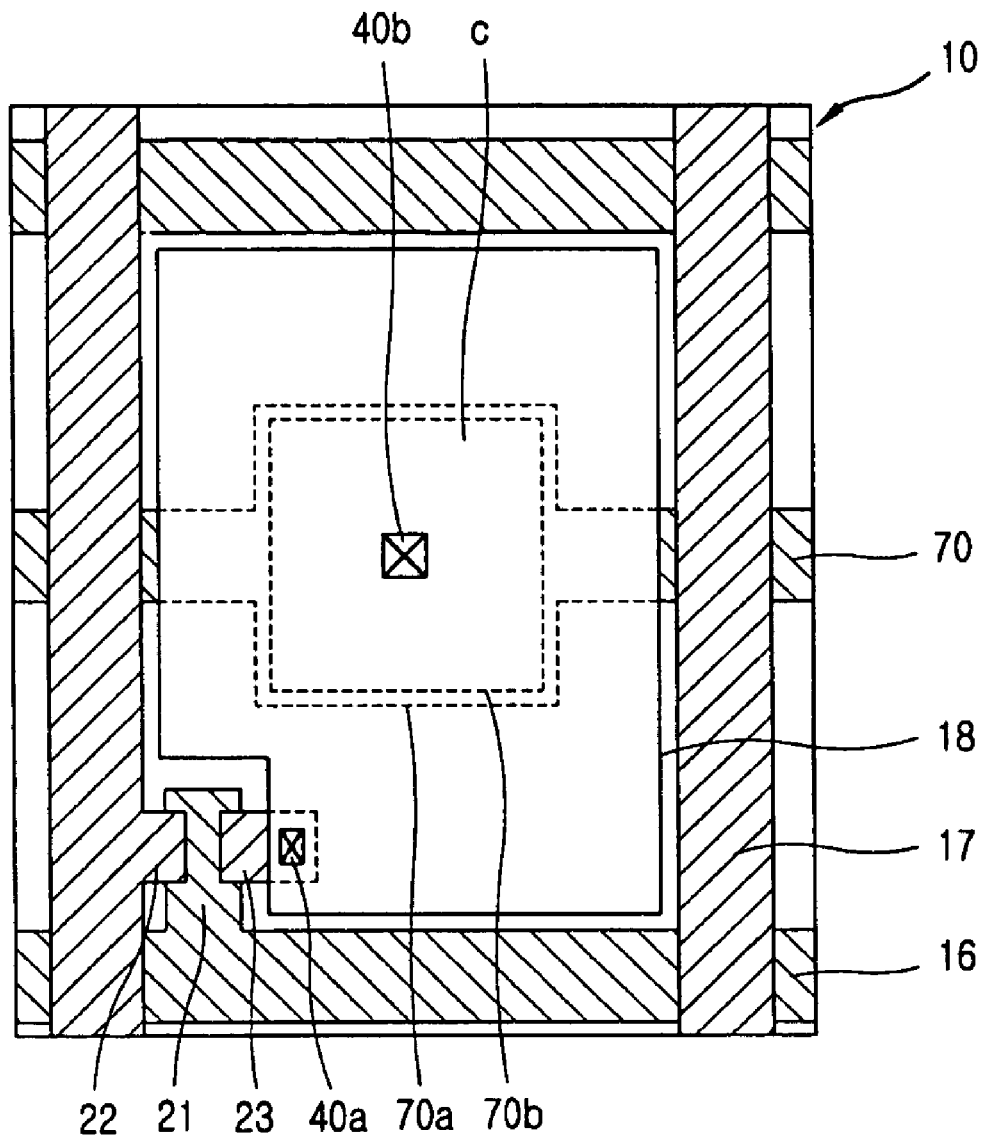
FIG. 1 is a partial plan view of an array substrate of a liquid crystal display panel in the related art.
Figure 2A:
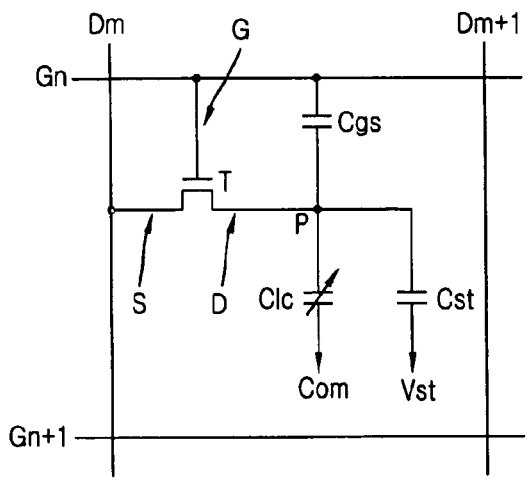
FIG. 2a is an equivalent circuit of a pixel within the liquid crystal display panel of FIG. 1.
Figure 2B:
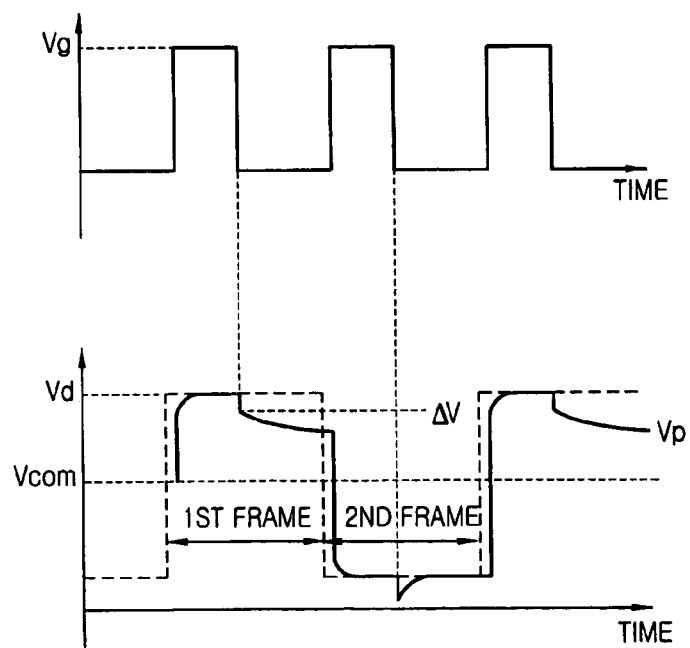
FIG. 2b is a graph of a pixel voltage versus time.
Figure 3:
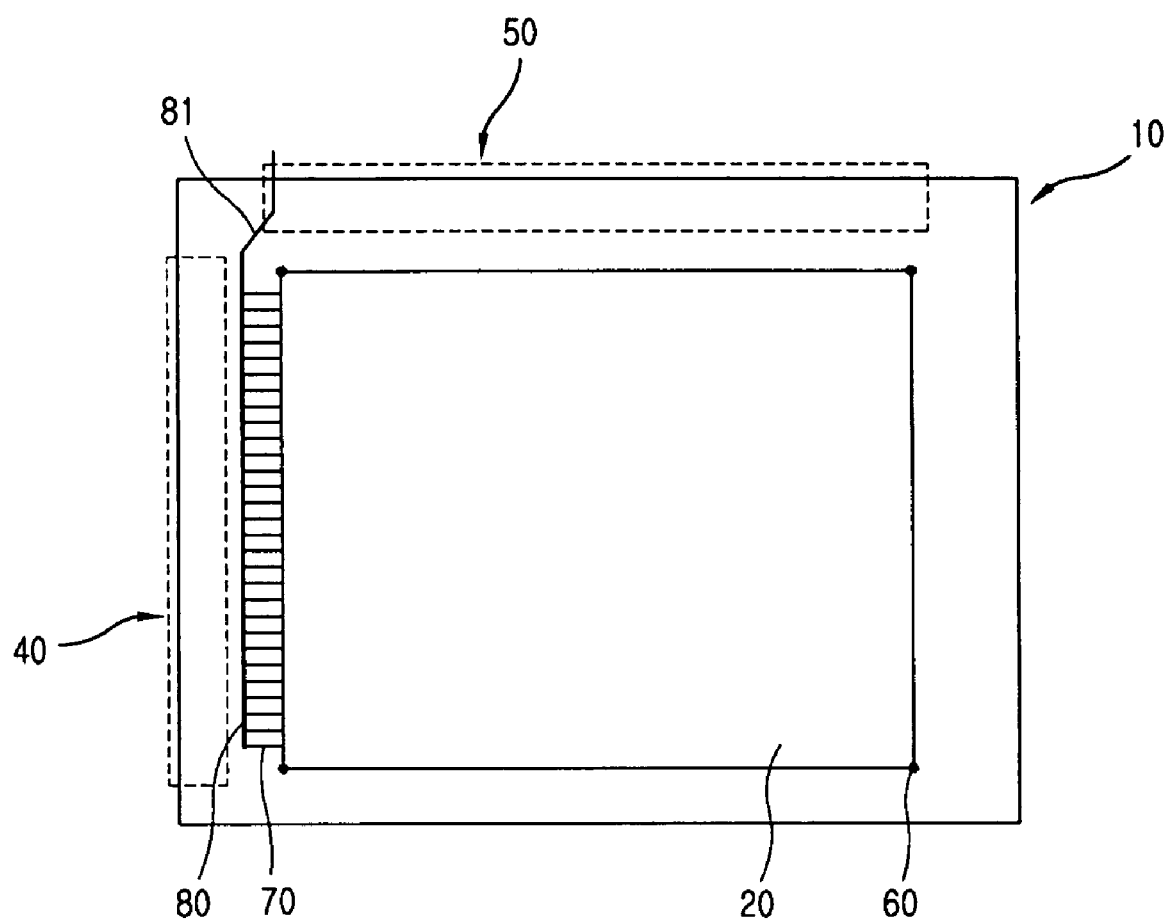
FIG. 3 is a plan view of an array substrate of FIG. 1.
Figure 4:
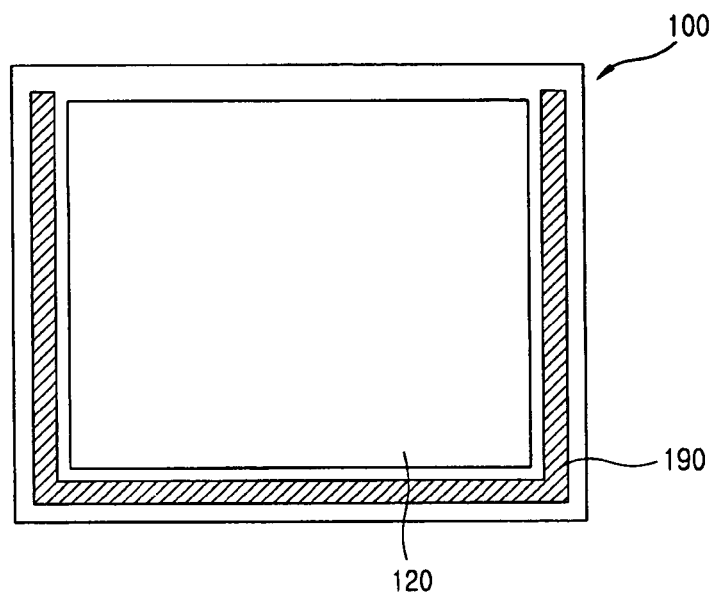
FIG. 4 is a plan view of a second substrate, such as a color filter substrate, of a liquid crystal display panel embodiment.

FIG. 4 is a plan view of a second substrate, such as a color filter substrate 100, which may couple a liquid crystal display. A conductive medium, such as the metal wiring 190 (or a second storage wiring) shown in FIG. 4, is disposed or formed outside of an image-display region of a color filter substrate 100. The image-display region may comprise a pixel portion 120 of the color filter substrate 100 that corresponds to a pixel portion 120 of an array substrate. In some embodiments, the pixel portions of the array and color filter substrates 110 and 100, are substantially parallel. Near a portion of its rectangular perimeter, the metal wiring 190 surrounds at least three sides of a pixel portion 120. While the embodiment encompasses any wire gauge, preferably a wire gauge that minimizes a capacitive coupling, internal source resistance, and/or other passive or dynamic impedance couples the color filter substrate 100 to the array substrate 10.

In FIG. 4, the conductive metal wiring 190 coupled to or disposed on the color filter substrate 100 may be coupled to storage wirings of the array substrate 110 through a conductive coupling. Any connector may be used such as a silver (Ag) dot pattern 160 disposed on the array substrate 110. In this embodiment, the silver dot pattern 160 couples the storage lines 170 disposed on the array substrate 110 of FIG. 5 to the to the metal wiring 190 disposed on the color filter substrate 100 of FIG. 4 through a silver paste.

Figure 5:
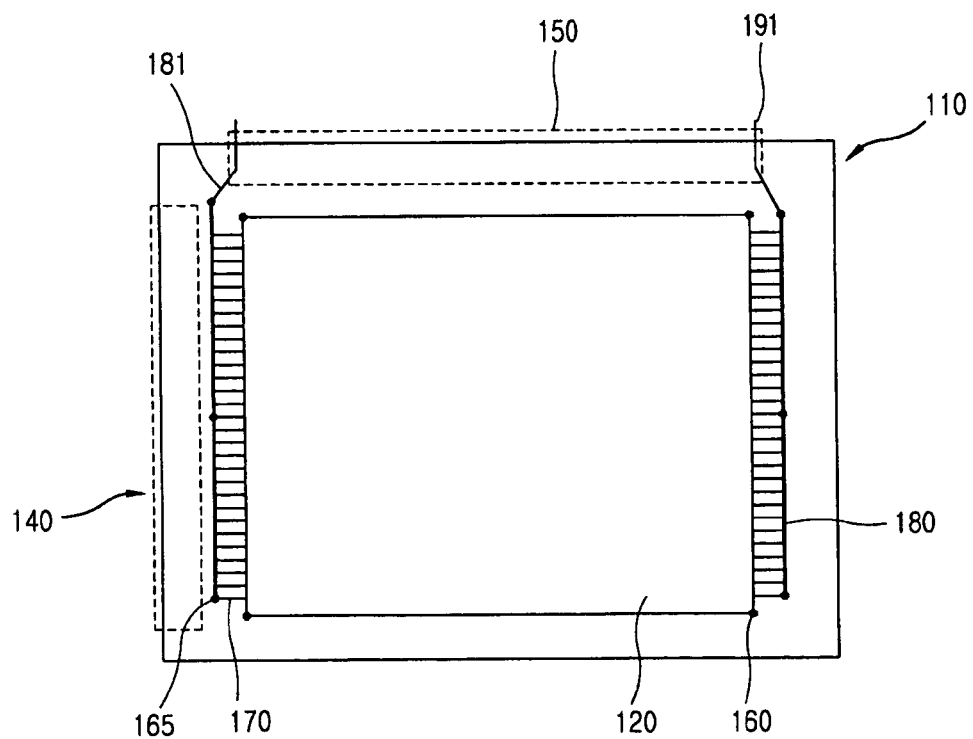
FIG. 5 is a plan view of an array substrate of the liquid crystal display panel of FIG. 4.

As shown in FIG. 5, storage wirings 170 may also be formed or disposed on a lower portion (i.e., an array substrate 110) of the liquid crystal display panel. By distributing the storage wiring between two or more substrates, the internal or source resistance of the storage wirings is reduced.

As further shown in FIG. 5, the array substrate 110 includes a pixel portion 120 formed by a plurality of pixel areas. A pixel area is formed by an intersection of one or more gate lines (not shown) with one or more data lines (not shown). A gate driving circuit 140 positioned substantially perpendicular to a data driving circuit 150 is also shown.

The gate and data driving circuits 140 and 150, respectively, includes pads. A gate driving circuit 150 includes gate pads (not shown) and a data driving circuit 140 includes data pads (not shown). In FIG. 5, these pads facilitate the transmission of signals to the gate and data lines.

Some embodiments provide a storage line 170 that extends in a gate line direction. The storage line 170 is insulated from each gate line at a predetermined interval with one of its ends electrically coupled to a storage signal supply wire 180 (or, a first storage wiring). The storage signal supply wire 180 may be positioned outside the pixel portion 120 of the array substrate 110 (e.g., at a pixel outer edge portion, a perimeter, or an image non-displayed region) in the direction of the data line. The term couple or coupled, in all uses, herein, is intended to encompass both direct and indirect electrical or mechanical coupling. Thus, a storage line 170 and a storage signal supply wire 180 are said to be coupled together when they are in direct contact, as well as when the storage line 170 couples an intermediate component or medium which couples the storage signal supply wire 180 directly or via one or more additional components.

The number of storage lines 170 used in the liquid crystal display embodiment may correspond to the number of gate lines. A storage voltage received by the storage line 170 through a storage signal supply wire 180 may be obtained from a common voltage applied to the color filter substrate 100 or through a separate storage voltage source. Although the storage voltage sourced to FIGS. 4 and 5 are received through a data tape carrier package, the storage voltage may also be received through a gate tape carrier package or through a combination thereof.

As shown in FIG. 5, both ends of each storage line 170 are connected to one pair of storage signal supply wires 180, and the storage wirings 180, 181, and 191 form an equipotential across the entire liquid crystal display panel embodiment. The storage signal supply wire 180 may be formed on the array substrate 110 and correspond to a conductive metal wiring 190 of the color filter substrate 100 attached to the array substrate 110.

As further shown in FIG. 5, the storage silver (Ag) paste dot patterns 165 disposed near the perimeter on the array substrate 110 preferably adhere to or couple the storage line 170 and metal wiring 190. The silver paste dot pattern 160 are respectively formed near four corners of the pixel portion 120 of the array substrate 110. In this configuration, a common voltage may be applied to the color filter substrate 100. In some embodiments, a plurality of storage silver (Ag) dot patterns 165 may be formed at or near both ends of the storage signal supply wire 180 or may be formed on the storage signal supply wire 180. The storage silver (Ag) dot pattern 165 may decrease the total resistance of the storage wires by connecting conductive metal wiring 190 that lie in a plane that contains the color filter substrate 100 with storage wirings 180, 181, and 191 disposed on the array substrate 110 that may be in a parallel plane. In this embodiment, the conductive metal wiring 190 and the storage signal supply wire 180 are electrically coupled or connected by the storage silver (Ag) dot pattern 165.

In the present embodiment, a portion of the storage wiring is distributed across the color filter substrate 100 and the array substrate 110. The storage wiring distribution may be coupled together through any conductive medium such as the storage silver (Ag) dot pattern 165 shown in FIG. 5. In this configuration, the total storage resistance of a liquid crystal display panel may be decreased and the storage voltage almost uniformly maintained across the liquid crystal display panel. Because the storage wiring may be distributed across substrates that are often adjacent, the system and method may be easily adapted to any assembly process and may be used with any display panel including those liquid crystal display panels described in the related art.

Although the descriptions of the embodiments describe a single pixel region of a display panel, the embodiments encompass entire display panels having one or multiple pixel regions formed by the intersection of multiple gate lines and multiple data lines. The inventions are not limited to a particular array substrate as the array substrate may be divided into a pixel portion, an image-display region, a pixel outer edge portion and an image non-display region.

It will be apparent to those skilled in the art that various modifications and variation can be made in the present invention without departing from the spirit or scope of the invention. Thus, it is intended that the present cover the modifications and variations of this invention provided they come within the scope of the appended claims and their equivalents.

What is claimed is:

1. A liquid crystal display panel, comprising:
   an array substrate;
   a plurality of gate lines and a plurality of data lines disposed on the array substrate forming a plurality of pixel regions at a pixel portion;
   a pixel electrode positioned within each pixel region;
   a switch positioned within each pixel region;
   a storage line insulated from each gate line at a predetermined interval and arranged in a gate line direction;
   first storage wirings disposed near an outer edge portion of the array substrate;
   a storage signal supply wire positioned outside the pixel portion of the array substrate; and
   a color filter substrate having a pixel portion corresponding to the pixel portion of the array substrate and having a second storage wiring positioned outside of the pixel portion.

2. The liquid crystal display panel of claim 1 further comprising a gate driving circuit and a data driving circuit disposed near a perimeter of the array substrate.

3. The liquid crystal display panel of claim 1 where the first storage wirings comprise the storage signal supply wire that extends in the data line direction and at least one connection formed at an end of the storage signal supply wire.

4. The liquid crystal display panel of claim 1 where the first storage wirings are connected to a data driving circuit that receives a storage signal.

5. The liquid crystal display panel of claim 1 wherein the first storage wirings are connected to a gate driving circuit that receives a storage signal.

6. The liquid crystal display panel of claim 1 further comprising a silver dot pattern disposed on at least one corner of pixel portion of the array substrate.

7. The liquid crystal display panel of claim 1 further comprising at least one conductive dot pattern disposed at the first storage wiring.

8. The liquid crystal display panel of claim 7 where the second storage wiring of the color filter substrate is electrically coupled to the first storage wirings of the array substrate by the conductive dot pattern so that a storage voltage forms an equipotential across an entire liquid crystal display panel.

9. The liquid crystal display panel of claim 1 further comprising a storage voltage source coupled to the storage line and being configured to source a storage voltage that forms almost an equipotential across an entire liquid crystal display panel.

10. The liquid crystal display panel of claim 1 where each storage line forms a storage capacitor within a pixel region.

11. A liquid crystal display panel comprising:
    an array substrate;
    a data line disposed on the array substrate;
    a gate line intersecting the data line near a first pixel region;
    a first storage wiring disposed near an edge of the array substrate;
    a second substrate comprising a second pixel region corresponding to the first pixel region;
    a storage signal supply wire positioned outside a pixel portion of the array substrate; and
    a second storage wiring disposed on the second substrate near an edge of the second substrate.

12. The liquid crystal display panel of claim 11 where the second substrate comprises a color filter substrate.

13. The liquid crystal display of claim 11 where the first storage wiring is coupled to the second storage wiring.

14. The liquid crystal display panel of claim 11 further comprising a storage voltage source coupled to the first storage wiring, where the storage voltage source is configured to source a storage voltage that forms almost an equipotential across an entire liquid crystal display panel.

15. The liquid crystal display panel of claim 11 where the first storage wiring and the second storage wiring are dimensioned to reduce an internal impedance.

16. The liquid crystal display panel of claim 15 where the internal impedance comprises a nonlinear impedance.

17. The liquid crystal display panel of claim 15 where the internal impedance comprises a linear impedance.

18. The liquid crystal display panel of claim 11 where the first storage wiring and the second storage wiring are coupled together by a silver paste.

19. The liquid crystal display panel of claim 11 where the first storage wiring and the second storage wiring are coupled together by a dot pattern.

20. The liquid crystal display panel of claim 11 wherein the first storage wiring is coupled to a gate driving circuit that receives a storage signal.

* * * * *